United States Patent [19]

Barker et al.

[11] Patent Number: 5,033,008

[45] Date of Patent: Jul. 16, 1991

[54] DYNAMIC SELECTION OF LOGICAL ELEMENT DATA FORMAT AS A DOCUMENT IS CREATED OR MODIFIED

[75] Inventors: Barbara A. Barker, Round Rock; Thomas R. Edel, Austin; Jeffrey A. Stark, Grapevine, all of Tex.

[73] Assignee: International Business Machines Corporation, Armonk, N.Y.

[21] Appl. No.: 554,980

[22] Filed: Jul. 17, 1990

Related U.S. Application Data

[63] Continuation of Ser. No. 223,131, Jul. 22, 1988, abandoned.

[51] Int. Cl.[5] ............................................. G06F 15/417
[52] U.S. Cl. .................................................... 364/523
[58] Field of Search ........ 364/518, 523, 200 MS File, 364/900 MS File

[56] References Cited

U.S. PATENT DOCUMENTS

| | | | |
|---|---|---|---|
| 4,464,730 | 8/1984 | Lawrence et al. | 364/900 |
| 4,513,391 | 4/1985 | Maddock | 364/900 |
| 4,723,211 | 2/1988 | Barker et al. | 364/900 X |
| 4,815,029 | 3/1989 | Barker et al. | 364/900 |
| 4,881,197 | 11/1989 | Fischer | 364/900 |
| 4,912,669 | 3/1990 | Iwamoto et al. | 364/900 |

OTHER PUBLICATIONS

Using Microsoft Word, 1986, Microsoft Corporation, pp. 293–318.
Using Microsoft Word, 2nd edition, 1987, Microsoft Corporation, pp. 64–75, 96–97, 169–195, 217–222, 251–253.

Primary Examiner—Gary V. Harkcom
Assistant Examiner—Mark K. Zimmerman
Attorney, Agent, or Firm—Andrew J. Dillon

[57] ABSTRACT

The data portion of a logical element in a document is dynamically modified as the data is created or edited. A decision as to what data format will be used is based on logical element characteristics such as the parent of the logical element, for example section, and the sequence of the logical element among the other children of the parent, for example first or subsequent paragraph within a section.

8 Claims, 5 Drawing Sheets

DYNAMIC SELECTION OF LOGICAL ELEMENT DATA FORMAT AS A DOCUMENT IS CREATED OR MODIFIED

This is a continuation of application Ser. No. 07/223,131, filed Jul. 22, 1988, now abandoned.

CROSS-REFERENCE TO RELATED APPLICATIONS

This application is related in subject matter to application Ser. No. 07/165,317 filed Mar. 8, 1988, entitled "Separation of Document Layout and Data Elements" and application Ser. No. 07/165,333 filed Mar. 8, 1988, entitled "Shell Structure for Management and Processing of Data Stream Structures", now abandoned, both by the inventors in this application and assigned to a common assignee.

BACKGROUND OF THE INVENTION

1. Field of the Invention

The present invention generally relates to document control architectures for use in data processing systems and, more particularly, to a technique for the dynamic selection of logical element data format based on logical element characteristics that are established as a document is created or modified.

2. Description of the Prior Art

When editing a document, changes in logical element relationships do not dynamically result in changes to the format of the data portion of a logical element. For example, an author may indent the first paragraph of each section of a document and block subsequent paragraphs in the document. When the first paragraph of a section is moved using existing state of the art editors, paragraph reformatting must be explicitly specified by the user if the movement results in a change of paragraph order within sections. New first paragraphs that were originally blocked must now be indented by entering indent commands or by linking the paragraph to a style sheet that specifies indented paragraph style. Similarly, indented paragraphs that are no longer first paragraphs must now be blocked by entering commands that cancel the indenting or by linking the paragraph to a style sheet that specifies blocked paragraph style.

A specific example in the so-called desktop publishing field is Xerox's Ventura Publisher product. This product uses style sheets into which text, graphic, table and/or image data may be imported from other application programs such as word processors, spread sheets and the like. Some style sheets are included with the product, and the user may generate other style sheets either by modifying existing style sheets or inputting the specifications for style sheets from scratch.

Once text has been imported, chapter headings, subheadings, first paragraphs and other document elements can be tagged resulting in formatting of the data according to predefined characteristics. For example, the first paragraph of a chapter might be formatted blocked with the first letter of the first sentence being a 36 point type size of a particular font with the rest of text characters in 10 point size and flowing around the first letter. However, in the course of editing the document, if the first paragraph is moved or changed, then the tags must be deleted and new tags applied to the new first paragraph. In other words, the tags are attached to and go with the paragraph. The same is true of other document elements such as titles, headings and the like.

SUMMARY OF THE INVENTION

It is therefore an object of the present invention to provide a method by which the format of the data portion of a logical element can be dynamically modified as the data is created or edited.

According to the invention, a decision as to what data format will be used is based on logical element characteristics such as the parent of the logical element, for example section, and the sequence of the logical element among the other children of the parent, for example first or subsequent paragraph within a section.

BRIEF DESCRIPTION OF THE DRAWINGS

The foregoing and other objects, aspects and advantages of the invention will be better understood from the following detailed description of a preferred embodiment of the invention with reference to the drawings, in which.

DETAILED DESCRIPTION OF A PREFERRED EMBODIMENT OF THE INVENTION

Figure 1:
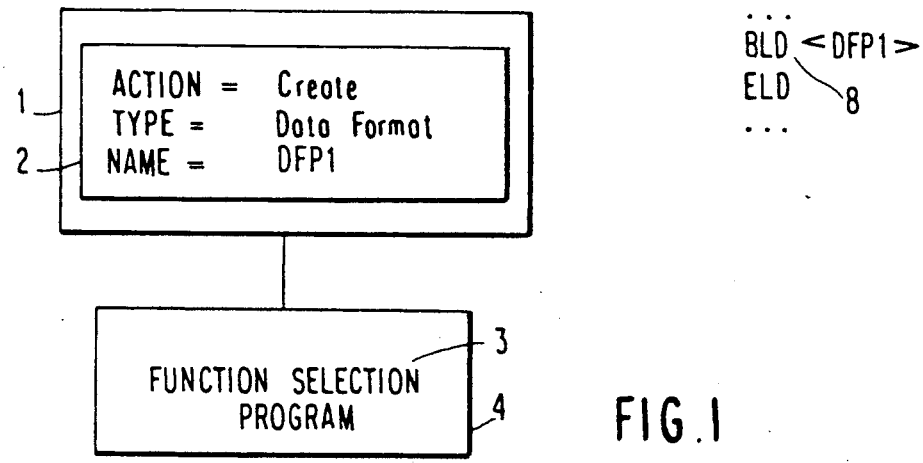
FIG. 1 is an illustration of a computer screen illustrating the creation of a data format specification.

Referring now to the drawings, and more particularly to FIG. 1, there is illustrated a screen 1 on which is displayed a data format creation menu 2. The menu is presented by application 3 that is running on device 4, such as a computer terminal or workstation, and which has been initiated by an operator of device 4. The application allows for the definition of a data format shell. In FIG. 1, the operator has entered "Create" after the "ACTION=" prompt, "Data Format" after the "TYPE=" prompt, and "DFP1" after the "NAME=" prompt. Therefore, application 3 starts a shell for a data format specification by automatically generating a Begin/End (BLD/ELD in FIG. 1) for data format specification shell 8 and displaying prompts on screen 1 whose answers will be used to complete the data format specification. The name entered by the operator, "DFP1", is automatically assigned as the name of the data format specification by application 3.

Figure 2:
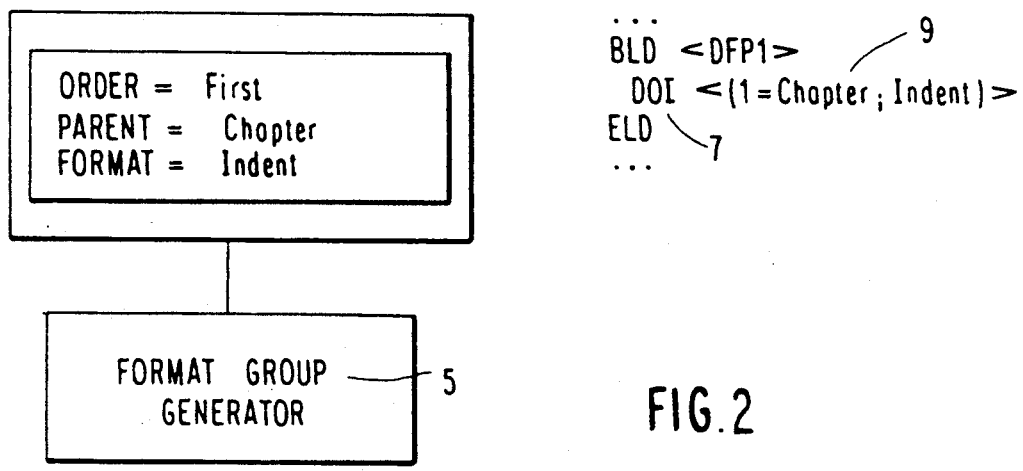
FIG. 2 is an illustration of a computer screen illustrating the specification by the operator of data format values.

FIG. 2 shows the prompts that are used to get information from the operator to fill in data format specification shell "DFP1". In response to the prompt "ORDER=", the operator selects "First". Other options such as second, subsequent, all, last, etc. are also available to the operator. Any known selection process will suffice. For purposes of this disclosure it is assumed that the cursor can be placed on the response area and a function key can be used to cycle through the available choices. When the desired choice appears, the operator selects it by depressing a designated key on the keyboard such as the ENTER key.

Application 5 builds a data format specification shell entry group (DOI in FIG. 2), and first entry 9 is created within group 7. Application 5 adds the argument "1" to entry 9 to specify that data for the first offspring of the designated parents, for example the first paragraph of a section, is to be formatted as specified by entry 9. In response to the prompt "PARENT=", the operator selects "Chapter" thereby declaring the parent for entry 9 to be a logical element named chapter. Other logical elements such as section, paragraph, prologue, index, table of contents, abstract, etc. are also available to the operator. Application 5 adds the argument chapter to entry 9 to specify that chapter is a parent logical element for the data format specified in entry 9. In response to the prompt "FORMAT=", the operator selects "Indent" thereby declaring the format of the data for the first offspring of a chapter is to be in an indented style. Application 5 adds the argument indent to entry 9. The sequence of prompts and responses is repeated as many times as needed to complete group 7.

Figure 3:
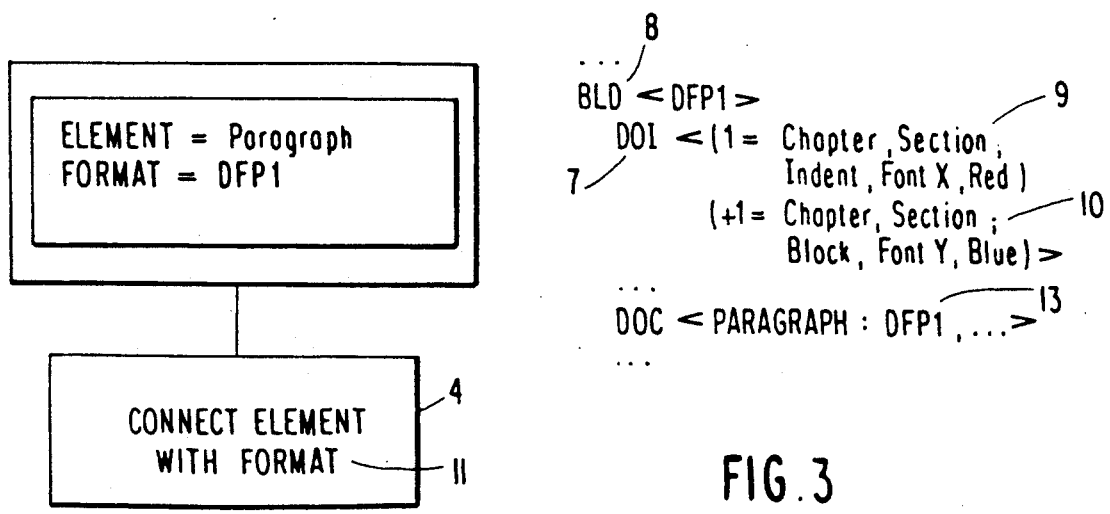
FIG. 3 is an illustration of a computer screen illustrating the connection of a logical element to a format.

In FIG. 3, group 7 has two entries 9 and 10 and each entry has several arguments for parent and data format style. FIG. 3 shows the prompts that are used to get information from the operator to connect logical element description 13 to data format specification shell 8. In response to the prompt "ELEMENT=", the operator selects "Paragraph". In response to the prompt "FORMAT=", the operator selects "DFP1". Application 11 that is running on device 4 now connects logical element definition 13 to data format specification shell 8. When an instance of a paragraph is created, shell 8 will be used to direct the formatting of data for that paragraph.

Figure 4:
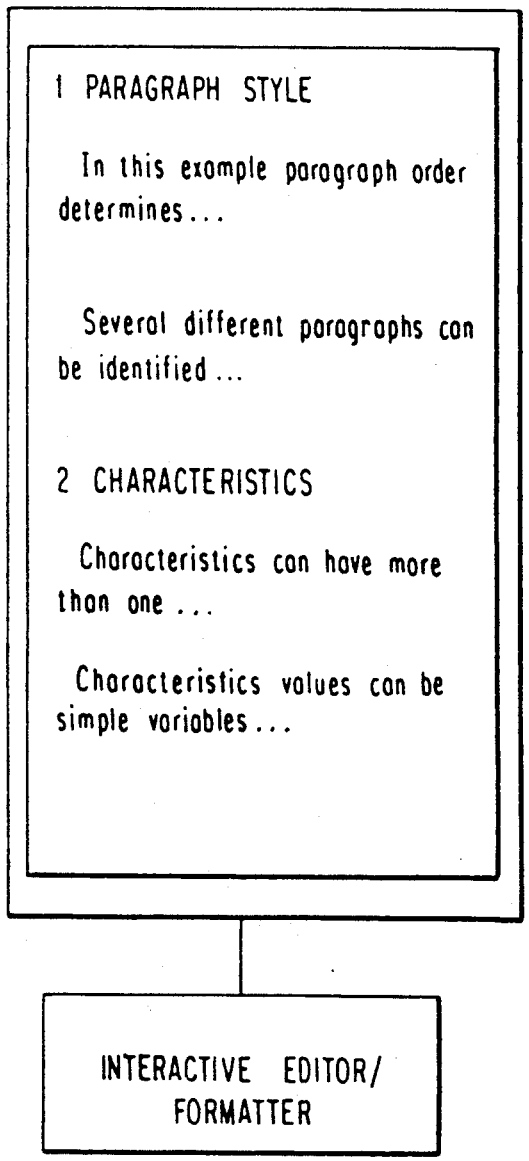
FIG. 4 is an illustration of a computer screen further illustrating the connection of a logical element to a format.

FIG. 4 shows a document that contains paragraph definition 13 linked to data format specification shell 8 and two section instances 16 and 17 which between them have four paragraphs instances 18, 19, 20, and 21. Data elements 22 and 23 are formatted in an indent style because they belong to the first paragraph instance in a section, and shell 8 specifies indent style for first paragraph data. Data elements 24 and 25 are formatted in a block style because they belong to subsequent paragraphs in sections 16 and 17, respectively, and shell 8 specifies block style for subsequent (noted as +1 in FIG. 4) paragraph data.

Figure 5:
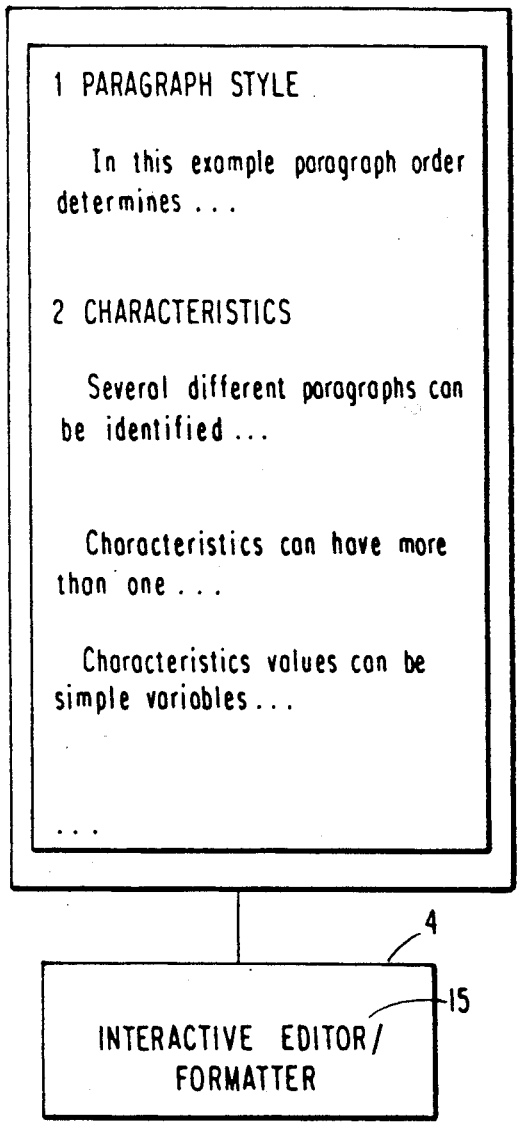
FIG. 5 is an illustration of a computer screen illustrating the movement of a logical element to a new position.

FIG. 5 shows what happens automatically when an operator moves a paragraph. Using editor 15 running on device 4, the operator moves paragraph 24 from a subsequent position in section 16 (see FIG. 4) to the first position in section 17. By following the rules in shell 8 for formatting of paragraph data, data for paragraph 24 is automatically restyled by application 15 from style: Block, Font Y, Blue to style: Indent, Font X, Red. Since the positioning of paragraph 23 is also changed from first to subsequent, its data is automatically restyled by application 15 according to shell 8 from style: Indent, Font X, Red to style: Block, Font Y, Blue.

Figure 6:
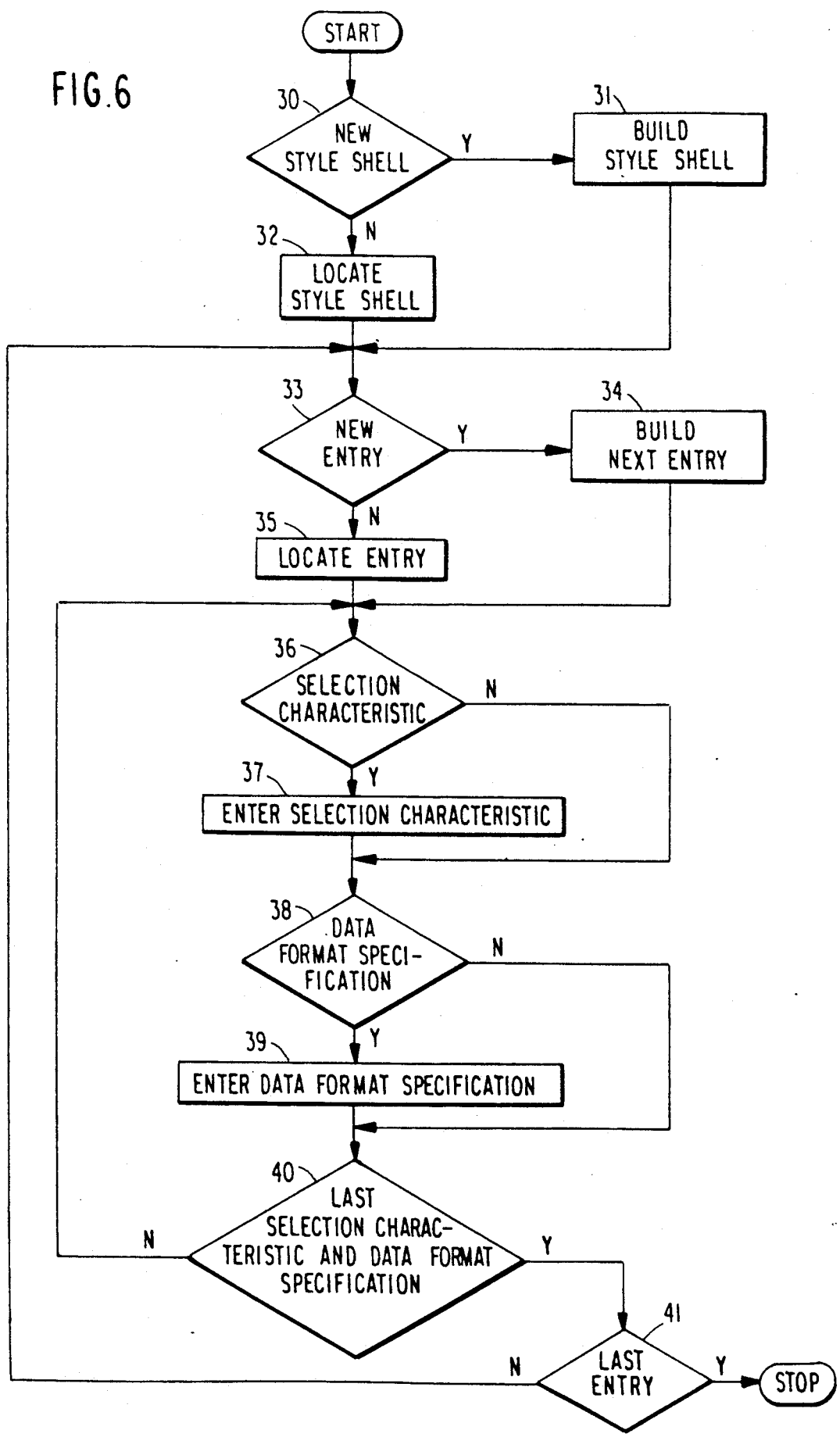
FIG. 6 is a flow chart showing the logic of the process that builds a data format specification according to the invention.

The logic of the process that builds a data format specification is shown in FIG. 6. The process begins with decision block 30 where a test is made to determine if a new shell type has been detected. If so, the shell style is built in function block 31; otherwise, the old shell style is located in function block 32. In either case, control next goes to decision block 33 where a test is made to determine if a new entry has been detected. If so, the next entry is built in function block 34; otherwise, the old entry is located in function block 35. In either case, control next goes to decision block 36 where a test is made to determine if a selection characteristic has been input. If so, the selection characteristic is entered in function block 37 before control goes to decision block 38; otherwise, control goes directly to decision block 38. In decision block 38, a test is made to determine if a data format specification has been input. If so, the data format specification is entered in function block 39 before control goes to decision block 40; otherwise, control goes directly to decision block 40. In decision block 40, a test is made to determine if the last selection characteristic and data format specification has been entered. If not, the process loops back to decision block 36. If so, a test is next made in decision block 41 to determine if the last entry has been processed. If not, the process loops back to decision block 33. If so, the process ends.

The following pseudocode implements the logic shown in the flow chart of FIG. 6. A programmer of ordinary skill in the art can write source code from the pseudocode in any desired computer language (e.g., Pascal, C, etc.) from which object code can be derived by a suitable compiler.

```
IF <New_Style> THEN
   CREATE <Style, Style_Ptr>
ELSE
   LOCATE <Style, Style_Name, Style_Ptr>
ENDIF
REPEAT
   IF <New_Entry> THEN
      CREATE <Entry, Style_Ptr, Entry_Ptr>
   ELSE
      LOCATE <Entry, Entry_Characteristic, Entry_Ptr>
   ENDIF
   REPEAT
      IF <Selection_Characteristic> THEN
         ENTER <Selection_Characteristic, Value,
                Entry_Ptr>
      ELSE
         IF <Data_Format_Specification, Value,
             Entry_Ptr>
            ENTER <Data_Format_Specification, Value,
                   Entry_Ptr>
         ENDIF
      ENDIF
   UNTIL <Last Selection_Characteristic and
          Data_Format_Specification>
UNTIL <Last Entry>
```

Figure 7:
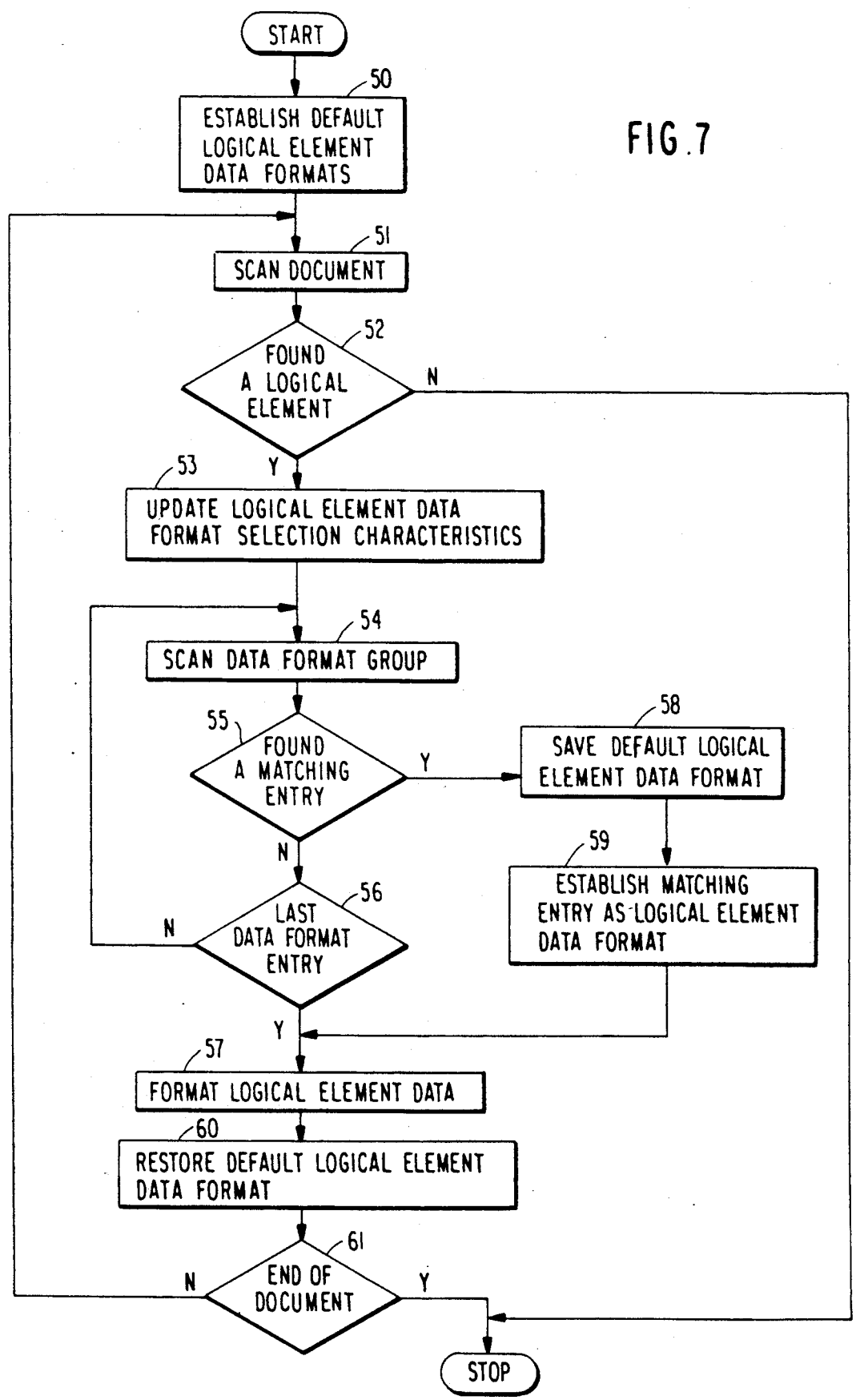
FIG. 7 is a flow chart showing the logic of the process that dynamically selects a logical element format according to the invention.

The logic of the process that dynamically selects a logical element format is illustrated in the flow chart shown in FIG. 7. The process begins at function block 50 by establishing default logical element data formats. The document is scanned in function block 51 and a test is made in decision block 52 to determine if a logical element is found. If not, the process ends; otherwise, the logical element data format selection characteristics are updated in function block 53 before the data format group is scanned in function block 54. A test is next made in decision block 55 to determine if a matching entry is found and, if not, a test is made in decision block 56 to determine if this was the last data format entry. If not, control loops back to function block 54 to again scan the data format group. Otherwise, control goes to function block 57.

If a matching entry is found in decision block 55, then the default logical element data format is saved in function block 58, and the matching entry is established as the logical element data format in function block 59. At this point, control goes to function block 57 where the logical element data is formatted. Next, the default logical element data format is restored in function block 60. A test is then made in decision block 61 to determine if this is the end of the document. If it is, the process ends, but if it is not, then control loops back to function block 61 to scan the document.

The following pseudocode implements the logic shown in the block diagram shown in FIG. 7. A programmer of ordinary skill in the art can write source code from the pseudocode in any desired computer language (e.g., Pascal, C, etc.) from which object code can be derived by a suitable compiler.

```
REPEAT
SET <Format_Declarations> TO <Default_Data_Formats>
GET <Element, Document>
IF <Element> IS IN <Document> THEN DO
  SET <Logical_Element_Characteristics>
  GET <Data_Format_Group, Logical_Element>
  REPEAT
    GET <Entry, Data_Format_Group>
    IF <Entry_Characteristics> EQUAL TO <Logical_
      Element_Characteristics> THEN DO
      SET <Format_Declarations> TO <Entry_Data_
      Format>
      SET <End_of_Data_Format_Group>
    END DO
  UNTIL <End_of_Data_Format_Group>
END DO
CALL <Format_Data, Format_Declarations, Logical_
  Element_Data>
UNTIL <End_of_Document>
```

There are several advantages to the invention. First, dynamic data formatting conforms to changes in specified logical element characteristics as a document is edited. Second, consistent document appearance is maintained without time consuming visual checking and explicit modification. Third, there is better quality control over the visual results. Fourth, the time required to produce and image a consistently formatted document is reduced.

While the invention has been described in terms of a single preferred embodiment, those skilled in the art will appreciate that the invention can be practiced with modification within the spirit and scope of the appended claims.

Having thus described our invention, what we claim as new and desire to secure by Letters Patent is as follows:

1. A process performed by a computer for dynamic selection of logical element data format in a document, said computer performed process comprising the steps of:

accessing logical element characteristics specifying logical element data format as a document is created or edited; and for each logical element in a document being created or edited, accessing said logical element data format to dynamically determine a data format for a logical element based on said logical element characteristics and an order of the logical element among other logical elements within a contextual definition of the document.

2. The process for dynamic selection of logical element data format recited in claim 1 further comprising the computer performed steps of:

moving a logical element to a new contextual location within the document while editing the document;

determining data format based on the new contextual location of said logical element; and using said data format to dynamically update the data format of the logical element as part of said moving step.

3. The process for dynamic selection of logical element data format recited in claim 1 wherein said order is a hierarchical order.

4. The process for dynamic selection of logical element data format recited in claim 1 wherein said order is a sequential order.

5. A computer performed method for dynamically and implicitly determining format of data within a document, said method comprising the steps of:

accessing attributes for logical elements of the document according to a hierarchy of logical elements within a contextual definition of the document; and as the document is created or modified, accessing said attributes to determine the data format of each logical element based on said attributes and a hierarchical position of the logical element in the document.

6. The method recited in claim 5 wherein the step of accessing attributes is performed by reading format style and characteristics for logical elements within said contextual definition of the document according to their hierarchical position in the document.

7. The method recited in claim 5 wherein the step of determining the data format includes selecting style choices for a logical element by linking each logical element of the document to a format style and characteristics according to the hierarchical position of the element in said document.

8. The method recited in claim 7 further comprising the computer performed step of dynamically changing the format styles and characteristics of logical element instances whenever a hierarchical order of the instances within the document is changed.

* * * * *